July 21, 1970  H. RITZENHOFF  3,521,473
METHOD OF AND APPARATUS FOR MAKING METALLIC CLOSURES
Filed March 27, 1967

Inventor:
HERMANN RITZENHOFF
BY Edwin E. Greigg
Attorney

United States Patent Office 3,521,473
Patented July 21, 1970

3,521,473
METHOD OF AND APPARATUS FOR MAKING METALLIC CLOSURES
Hermann Ritzenhoff, Marburg (Lahn), Germany, assignor to Gebruder Seidel K.G., Marburg (Lahn), Germany, a corporation of Germany
Filed Mar. 27, 1967, Ser. No. 626,077
Claims priority, application Germany, Apr. 2, 1966, S 103,003
Int. Cl. B21c 23/18
U.S. Cl. 72—267      2 Claims

ABSTRACT OF THE DISCLOSURE

An internally threaded, externally smooth cap-like extruded closure, the internal side wall of which is provided with axially extending, inwardly protruding, circumferentially spaced ribs carrying thread means applied thereto subsequent to the extrusion of the closure effectuated by means of a mandrel having on its lateral surface axial grooves for making said ribs.

---

The invention relates to cap-like, internally threaded closures made of a deformable blank by means of extrusion and adapted to be secured to bottle necks, container openings, pencils, pens and the like.

It is known to make closures by extruding blanks. In these processes, the blank is placed in a mold, whereupon a hydraulically operated ram or mandrel is forced into the mold deforming the blank into a cap or hat-like shape. Subsequently, the marginal portion of the internally and externally smooth closure is further deformed in a press to provide internal threads. This threading operation, however, affects the entire thickness of the closure wall and consequently the closure loses its external smoothness.

In order to preserve a smooth outer face of the closure—which is not without interest for sales purposes—it has been known to insert into the cap a threaded plastic or metallic internal cap or sleeve instead of applying the thread directly to the closure wall. Such a method, although the attractive smooth appearance of the closure is preserved thereby, is relatively complicated and expensive.

Threaded closures are also made by the known process of cutting a solid rod into small pieces of closure length, providing each with an axial bore and subsequently cutting a thread thereinto. This method, however, is lengthy and requires a large amount of material resulting in considerable waste.

Briefly stated, the invention provides a cap-like closure having a smooth outer face and having a plurality of axially extending, inwardly protruding ribs carrying thread means. The closure is made by placing a blank into an opening mold, introducing an axially grooved mandrel through the opening of the mold, thus causing the blank to be deformed and extruded axially from the mold onto the mandrel. The grooves on the mandrel form, during extrusion, the said ribs in the internal wall of the closure. Subsequently, thread means are cut or otherwise applied to the ribs leaving both the internal and the external wall faces of the closure undisturbed.

In view of the foregoing, it is an object of the invention to provide an improved cap-like closure with internal thread means which, despite a simple and inexpensive process of manufacture, has a smooth outer face undisturbed by the internal thread means.

Figure 1:
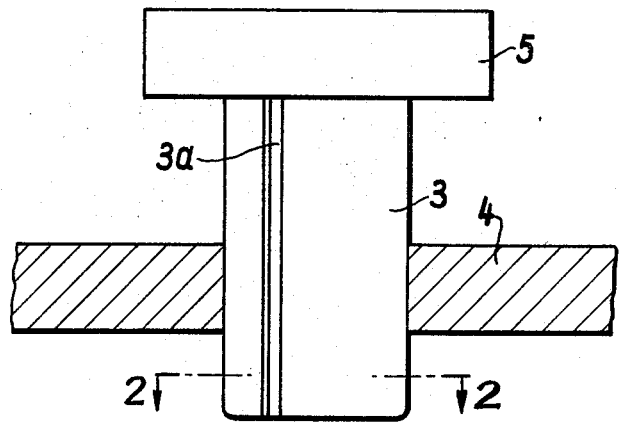
Figure 2:
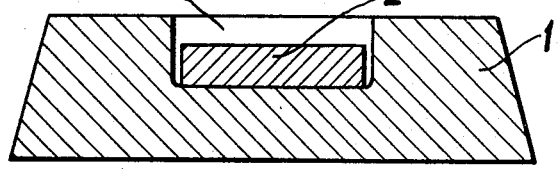

The invention will be better understood and further advantages will become more apparent from the ensuing description of exemplary embodiments taken in conjunction with the drawings, wherein:

FIG. 1 is a schematic, partially sectional, elevational view of the apparatus for forming the closure;
FIG. 2 is a sectional view of the mandrel taken along line 2—2 of FIG. 1; and
FIGS. 3–6 are sectional elevational views of the closure made with the apparatus shown in FIGS. 1 and 2 and having various internal thread means.

Turning now to FIG. 1, there is shown a mold 1 having an upwardly open mold cavity 1a, the contour of which is preferably, but not necessarily, circular. Placed into cavity 1a is a loosely fitting, deformable blank 2, the thickness of which is preferably smaller than the depth of the cavity 1a. The blank is made preferably, but not necessarily, of a relatively soft metal, such as copper, brass, iron or aluminum. The latter is particularly adapted for the present purpose.

Above the mold cavity 1a substantially coaxially therewith, there is disposed a mandrel 3 adapted to reciprocate linearly between guides 4. The mandrel 3 is of such a circumference as to be adapted to loosely fit into the cavity 1a insuring a clearance between the side wall of the cavity 1a and the surface of mandrel 3. The mandrel 3 is actuated by power means 5 which may comprise a hydraulic mechanism or any other suitable power source. The mandrel 3 is provided on its lateral surface with three axially extending, circumferentially spaced grooves 3a (FIGS. 1 and 2).

The apparatus operates in the following manner:
After the blank 2 has been placed into the mold cavity 1a, the power means 5 is actuated to cause mandrel 3 to penetrate into the mold cavity compressing the blank 2. The mandrel 3 penetrates so far into cavity 1a until the distance between the base of the cavity 1a and the front or leading face of mandrel 3 equals the desired thickness of the end wall of the closure 2a (FIGS. 3–6). The remainder of the material of blank 2 forms the side wall of the closure by extruding from the cavity through the clearance between the mandrel and the side wall of the cavity and conforming to the outer face of the mandrel. It is thus seen that the thickness of the side wall of the closure is determined by said clearance. Further, axial grooves 3a on mandred 3 produce internal, lengthwise extending parallel ribs 2b on the side wall of the closure.

The placing of blanks into the mold cavity and the removal of the closures after the withdrawal of the mandrel 3 may be carried out by suitable feeding and conveying means (not shown).

Subsequent to its removal from the closure forming apparatus described hereinabove, the closure 2a is submitted to a final operation providing ribs 2b with desired thread means.

Figure 3:
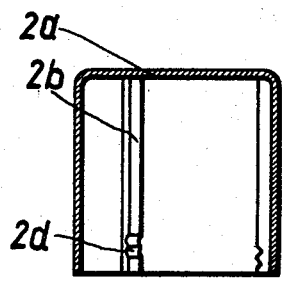
Figure 4:
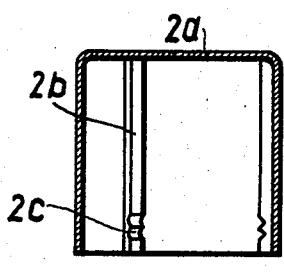

Turning now to FIGS. 3 and 4, there are shown threads 2d and 2c, respectively, cut into ribs 2b by known means. Thread 2d (FIG. 3) has a helical course for rotary type closures, while thread 2c (FIG. 4) is formed by cuts of equal height for snap-type closures.

Figure 5:
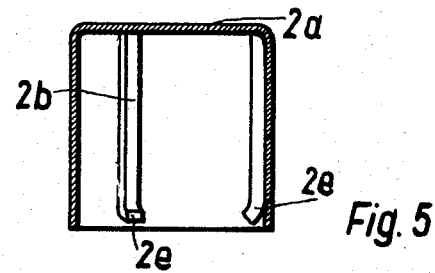
Figure 6:
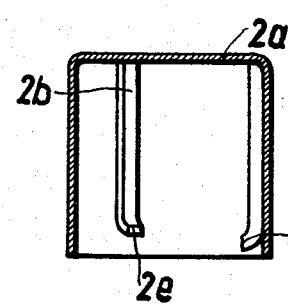

A different type of thread means is shown in FIGS. 5 and 6. Here, the lower end of ribs 2b is stamped free and bent inwardly to form tongues 2e. FIG. 5 shows a snap-type closure wherein the tongues 2e are disposed at equal height. The closure depicted in FIG. 6, on the other hand, is of the rotary type wherein tongues 2e are at different heights.

It is to be well understood that the number of the rib-forming grooves 3a is not limited to three, but may be as few as two, or may be four or more.

It is seen that the above-described method and apparatus makes possible the manufacture of internally threaded closures that are not bored or provided with threaded inserts and yet have an undisturbed, smooth and attractive external surface.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

That which is claimed is:

1. A method of making a cap-like closure of the type having a side wall, one closed end and an opposed open end and provided with internal thread means, comprising the following steps:
   (a) placing a deformable blank into an upwardly open mold cavity,
   (b) introducing a laterally and axially grooved mandrel into said cavity to form said closed end by compressing said blank in said cavity with the leading face of said mandrel and to form an internally ribbed wall by extruding the remainder of said blank from said cavity onto said grooved mandrel as the latter is being introduced into said cavity, and
   (c) providing the ribs of said ribbed wall with thread means.

2. A method as defined in claim 1, wherein the last-named step includes freeing the terminal portion of each of said ribs from said wall and bending said terminal portion inwardly to form tongues constituting said thread means.

References Cited

UNITED STATES PATENTS

| | | |
|---|---|---|
| 1,171,702 | 2/1916 | Carlson. |
| 1,974,252 | 8/1932 | Killorin. |
| 2,090,640 | 8/1937 | Rosenberg. |

FOREIGN PATENTS

| | | |
|---|---|---|
| 677,779 | 8/1952 | Great Britain. |
| 220,539 | 7/1942 | Germany. |

CHARLES W. LANHAM, Primary Examiner

A. L. HAVIS, Assistant Examiner

U.S. Cl. X.R.

10—86; 72—256, 356